US008892471B2

(12) United States Patent
Barrs, II et al.

(10) Patent No.: US 8,892,471 B2
(45) Date of Patent: *Nov. 18, 2014

(54) MODIFYING A DIGITAL MEDIA PRODUCT

(75) Inventors: John W. Barrs, II, Ausitn, TX (US); Michael W. Brown, Georgetown, TX (US); Paul S. Williamson, Round Rock, TX (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1961 days.

This patent is subject to a terminal disclaimer.

(21) Appl. No.: 11/696,239

(22) Filed: Apr. 4, 2007

(65) Prior Publication Data

US 2008/0249942 A1    Oct. 9, 2008

(51) Int. Cl.
*G06F 21/00* (2013.01)
*G06F 21/10* (2013.01)

(52) U.S. Cl.
CPC ........ *G06F 21/10* (2013.01); *G06F 2221/0731* (2013.01); *Y10S 707/99948* (2013.01)
USPC .......................... 705/52; 705/51; 707/999.107

(58) Field of Classification Search
CPC ..................................................... G06Q 30/06
USPC .......................................................... 705/52
See application file for complete search history.

(56) References Cited

U.S. PATENT DOCUMENTS

| 5,267,351 | A |   | 11/1993 | Reber et al. |
|---|---|---|---|---|
| 5,629,980 | A | * | 5/1997 | Stefik et al. ........... 705/54 |
| 5,734,719 | A | * | 3/1998 | Tsevdos et al. ....... 700/234 |
| 5,761,606 | A | * | 6/1998 | Wolzien ............... 725/110 |
| 5,862,325 | A |   | 1/1999 | Reed et al. |
| 7,761,606 | B2 |   | 1/1999 | Reed et al. |

(Continued)

FOREIGN PATENT DOCUMENTS

| WO | WO 03/081438 | 10/2003 |
|---|---|---|
| WO | WO 03081438 A1 | 10/2003 |

(Continued)

OTHER PUBLICATIONS

Agius, H., Angelides, M. C., COSMOS-7: Video-Oriented MPEG-7 Scheme for Modelling and Filtering of Semantic Content, 2005, The Computer Journal, vol. 48, Issue 5, pp. 545-562.*

(Continued)

*Primary Examiner* — Matthew Zimmerman
*Assistant Examiner* — Alexis Casey
(74) *Attorney, Agent, or Firm* — DeLizio Gilliam, PLLC

(57) ABSTRACT

Producing, by a digital media production hub from users' digital expressions of preferences, information describing a user community's preference for replacing the modifiable part of the digital media product with a replacement part; receiving, in the digital media production hub from a media product owner, the digital media product and a digital grant of rights to modify and distribute the digital media product; receiving, by the digital media production hub from a media parts provider, at least one replacement part, a digital grant of rights to use the replacement part to modify the digital media product, and a digital grant of rights to distribute the replacement part with the digital media product; and replacing, by the digital media production hub in accordance with the information describing the user community preference and the digital grants of rights, the modifiable part with the replacement part.

18 Claims, 11 Drawing Sheets

(56) References Cited

U.S. PATENT DOCUMENTS

| | | | |
|---|---|---|---|
| 5,915,019 A * | 6/1999 | Ginter et al. | 705/54 |
| 6,100,925 A * | 8/2000 | Rosser et al. | 348/169 |
| 6,253,193 B1 * | 6/2001 | Ginter et al. | 705/57 |
| 6,748,421 B1 * | 6/2004 | Ozkan et al. | 709/206 |
| 6,778,224 B2 * | 8/2004 | Dagtas et al. | 348/586 |
| 6,920,436 B2 | 7/2005 | Stefik et al. | |
| 7,230,653 B1 * | 6/2007 | Overton et al. | 348/584 |
| 7,389,270 B2 * | 6/2008 | Stefik et al. | 705/51 |
| 7,596,583 B2 | 9/2009 | Chang | |
| 7,693,871 B2 | 4/2010 | Barrs, II et al. | |
| 7,721,307 B2 * | 5/2010 | Hendricks et al. | 725/34 |
| 7,730,509 B2 * | 6/2010 | Boulet et al. | 725/46 |
| 2003/0120928 A1 | 6/2003 | Cato et al. | |
| 2004/0003139 A1 | 1/2004 | Cottrille et al. | |
| 2004/0010602 A1 | 1/2004 | Van Vleck et al. | |
| 2004/0187160 A1 * | 9/2004 | Cook et al. | 725/94 |
| 2005/0021467 A1 | 1/2005 | Franzdonk | |
| 2005/0091683 A1 | 4/2005 | Sheynman et al. | |
| 2006/0112015 A1 * | 5/2006 | Chancellor et al. | 705/51 |
| 2006/0167801 A1 | 7/2006 | Stefik et al. | |
| 2006/0271973 A1 * | 11/2006 | Jerding et al. | 725/86 |
| 2007/0094691 A1 * | 4/2007 | Gazdzinski | 725/62 |
| 2007/0157252 A1 * | 7/2007 | Perez | 725/61 |
| 2007/0220580 A1 * | 9/2007 | Putterman et al. | 725/134 |
| 2007/0274519 A1 | 11/2007 | Cohen et al. | |
| 2008/0010658 A1 * | 1/2008 | Abbott et al. | 725/87 |
| 2008/0109307 A1 * | 5/2008 | Ullah | 705/14 |
| 2008/0126301 A1 | 5/2008 | Bank et al. | |
| 2008/0195938 A1 | 8/2008 | Tischer et al. | |
| 2008/0249942 A1 | 10/2008 | Barrs et al. | |
| 2008/0249943 A1 | 10/2008 | Barrs et al. | |
| 2008/0250065 A1 | 10/2008 | Barrs et al. | |
| 2008/0250458 A1 * | 10/2008 | Roman | 725/61 |
| 2008/0250465 A1 * | 10/2008 | Kim et al. | 725/87 |

FOREIGN PATENT DOCUMENTS

| | | |
|---|---|---|
| WO | 2007080479 | 7/2007 |
| WO | WO 2007080479 A2 * | 7/2007 |
| WO | 2007140415 | 12/2007 |
| WO | WO 2007140415 A2 | 12/2007 |

OTHER PUBLICATIONS

Susan Wegner, Prototype Description of an Open DRM Architecture, Project Report P1207, OPERA—Interoperability of Digital Rights Management (DRM) Technologies, Dec. 2003, pp. 1-33, EDIN 0439-1207.

Susan Wegner, Prototype Description of an Open DRM Architecture, Project Report P1207, OPERA-Interoperability of Digital Rights Management (DRM) Technologies, Dec. 2003, pp. 1-33, EDIN 0439-1207.

Office Action Dated May 20, 2009 in U.S. Appl. No. 11/696,252.

U.S. Appl. No. 11/696,272, filed Apr. 2007, Barrs et al.

U.S. Appl. No. 11/696,252, filed Apr. 2007, Barrs et al.

U.S. Appl. No. 11/696,239, filed Apr. 2007, Barrs et al.

Office Action Dated Jul. 22, 2009 in U.S. Appl. No. 11/696,239.

Notice of Allowance Dated Nov. 18, 2009 in U.S. Appl. No. 11/696,252.

Office Action Dated Feb. 17, 2010 in U.S. Appl. No. 11/696,239.

Final Office Action, U.S. Appl. No. 11/696,239, Jul. 12, 2010.

Office Action, U.S. Appl. No. 11/696,272, Apr. 13, 2010.

Final Office Action, U.S. Appl. No. 11/696,272, Aug. 9, 2010.

U.S. Appl. No. 11/696,252 Notice of Allowance, Nov. 18, 2009, 11 pages.

U.S. Appl. No. 11/696,252 Office Action, May 20, 2009, 30 pages.

U.S. Appl. No. 11/696,272 Office Action, Jul. 15, 2011, 22 pages.

U.S. Appl. No. 11/696,272 Final Office Action, Aug. 9, 2010, 29 pages.

U.S. Appl. No. 11/696,272 Final Office Action, Dec. 23, 2011, 31 Pages.

U.S. Appl. No. 11/696,272 Office Action, Apr. 13, 2010, 23 pages.

Wegner, Susan, "Prototype Description of an Open DRM Architecture", OPERA-Interoperability of Digital Rights Management (DRM) Technologies http://archive.eurescom.eu/~pub/deliverables/documents/P1200-series/P1207/D3/P1207-D3.pdf (Obtained from the Internet on Mar. 26, 2012) Dec. 2003, 33 pages.

* cited by examiner

| Grant Of Rights To Modify And Distribute 424 |
|---|
| Identification Of One Or More Modifiable Parts Of The Digital Content 502 |
| Identification Of One Or More Specific Entities Authorized To Modify Modifiable Parts Of The Digital Content 504 |
| Specification Of A Scope Of Authorized Modifications For Modifiable Parts Of The Digital Content 506 |
| Specification Of License Fees For Modification Of Modifiable Parts Of The Digital Content To Be Distributed In The Digital Media Product 508 |
| Specification Of Requirements For Review And Approval Of Modifications 510 |

FIG. 6

MODIFYING A DIGITAL MEDIA PRODUCT

BACKGROUND OF THE INVENTION

1. Field of the Invention

The field of the invention is data processing, or, more specifically, methods, apparatus, and products for modifying a digital media product.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which substantial technical advances have been is editing and delivery of digital media products. With the expanding menu of media (audio, video, text) becoming available on-line, media owners have unprecedented channels through which to reach potential customers. Media content is often created to cater to specific, "least common denominator" demographic cultures or subgroups. Once a version of media content is created and released, it is inefficient and expensive for media owners to analyze and identify potential revenue opportunities if "tailored" versions were created of the media, modify the existing, licensed, media based upon the new opportunities and distribute the "tailored" versions of the media targeted to appeal to demographic subgroups who would yield the most revenue and profit to the media owner.

Currently, when media owners choose to release a new version of media, potential modifications to the media are based upon human analysis of input from focus groups and the like. These modifications are subject to inaccurate interpretation of customer preferences by the focus group leaders, producers and editors, and this process for media creation has a very long cycle between understanding the proposed modifications and the creation of the newly modified content.

SUMMARY OF THE INVENTION

Methods, apparatus, and computer program products are described for modifying a digital media product, where the digital media product includes digital media content, the digital media content include a modifiable part, the methods, apparatus, and products include producing, by a digital media production hub from users' digital expressions of preferences, information describing a user community's preference for replacing the modifiable part of the digital media product with a replacement part; receiving, in the digital media production hub from a media product owner, the digital media product and a digital grant of rights to modify and distribute the digital media product; receiving, by the digital media production hub from a media parts provider, at least one replacement part, a digital grant of rights to use the replacement part to modify the digital media product, and a digital grant of rights to distribute the replacement part with the digital media product; and replacing, by the digital media production hub in accordance with the information describing the user community preference and the digital grants of rights, the modifiable part with the replacement part.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6 sets forth a line drawing illustrating an example data structure representing a digital grant of rights to modify and distribute a digital media product according to embodiments of the present invention.

DETAILED DESCRIPTION OF EXEMPLARY EMBODIMENTS

Figure 1:
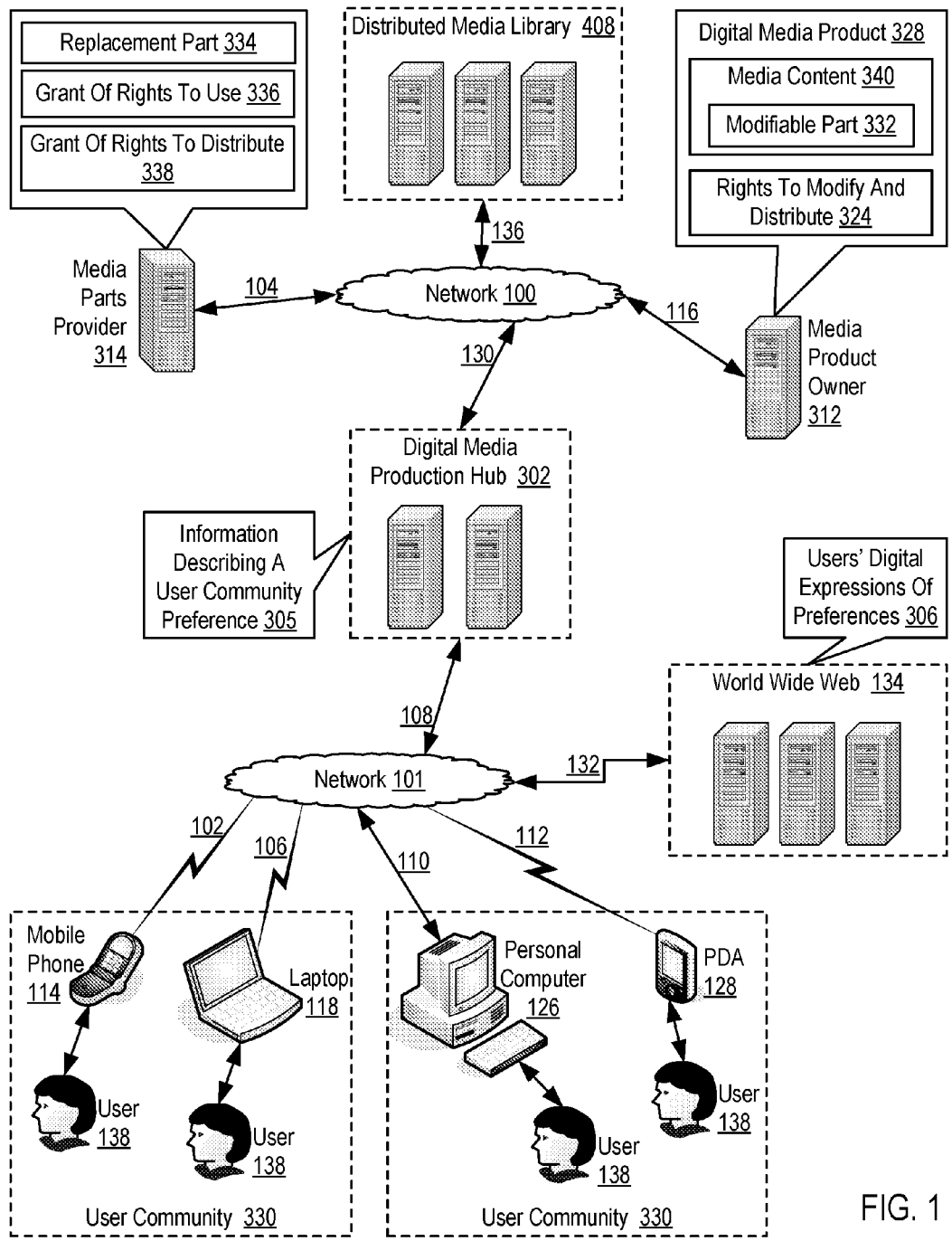
FIG. 1 sets forth a network diagram of an exemplary system for modifying a digital media product according to embodiments of the present invention.

Exemplary methods, apparatus, and products for modifying a digital media product in accordance with the present invention are described with reference to the accompanying drawings, beginning with FIG. 1. FIG. 1 sets forth a network diagram of an exemplary system for modifying a digital media product (328) according to embodiments of the present invention. A digital media product, as opposed to an analog media product, refers to electronic or optical media having content that is implemented with binary digital encodings. 'Digital' refers to two discrete states used to implement the digital encodings, variously referred to as "0" and "1", "true" and "false", "active" and "inactive", "on" and "off", and so on. Computers as described in this specification are machines that interpret the binary digital encodings as information, the information referred to in this specification as "digital media content." Digital media products such as digital audio, digital video, and other digital media content can be created, referred to, and distributed by computers and data communications networks composed of computers. Digital media products are substantially different from the older analog media products such as analog recordings on vinyl records and magnetic tape. Examples of digital media products include compact discs, digital video discs, digital television, e-books, video games, the Internet, the World Wide Web, cell phones, other interactive media, and many others products as will occur to those of skill in the art.

In the example of FIG. 1, the digital media product (328) includes digital media content (340), and the digital media content includes a modifiable part (332). A modifiable part (332) is an identifiable portion of the digital media content (340) that is authorized by an owner (312) of the digital media product (328) to be modified by a digital media production hub (302) by replacing the modifiable part (332) with a replacement part (334) supplied by a media parts provider (314). For an explanation of how a modifiable part of digital media content may be identified for replacement, consider an example of a digital video movie made up of scenes, video clips, video frames, and modifiable part, where the components of the movie are organized according to this example XML:

```
<product header type="digital video movie" name="GoldenEye ">
    <content>
        <scene id="001" rsrc="www.rts.com/rights?frame=001">
            <clip id="001" rsrc="+"></clip>
            <clip id="002 rsrc="+"></clip>
                <frame id="39457">
                    <part id ="001"
                        psrc="www.objs.com/pixels?frame=39457,obj=001">
                </frame>
                <frame id="39458">
                    <part id ="001"
                        psrc="www.objs.com/pixels?frame=39458,obj=001">
                </frame>
                . . .
            <clip id="003" rsrc="www.rts.com/rights?frame=001"></clip>
            <clip id="004" rsrc="+"></clip>
        </scene>
        . . .
        <scene id="123"> "Climax Scene"
            <sla>/special/timewarner.specialcontracts.23421.xsd</sla>
        </scene>
        . . .
    </content>
</product>
```

This XML example is said 'pseudocode,' so called because it is an explanation expressed in the form of code as opposed to an actual working model of computer code. This example illustrates a hierarchical organization of digital media content in a digital media product, where the hierarchy is:

```
                product
                    content
                        scene
                            clip
                                frame
                                    modifiable part
                            modifiable part
                        modifiable part
```

The digital media product in this example is identified in the <product> element as having type "digital video movie" and is identified by the name "GoldenEye" as a James Bond movie. The digital media content in this example is identified by a <content> element; scenes are identified by <scene> elements; clips are identified by <clip> elements; frames are identified by <frame> elements; and modifiable parts are identified by <part> elements. Although such digital media content may include any number of clips, this example identifies four clips: clips 001, 002, 003, and 004.

In this James Bond movie example, clips can inherit from scenes digital rights to modify and distribute the contents of a clip. The <clip> elements contain 'rsrc' attributes, standing for 'rights source,' that specify a source for specification of the digital rights to modify and distribute the contents of the clip. For clips 001, 002, and 004, the rsrc attribute value "+" specifies that the clips inherit digital right from the scene of which they are parts. Sources of digital rights for scenes are identified in a couple of exemplary, alternative ways. Scene 001 has an rsrc attribute that identifies a source of digital rights with the URL "www.rts.com/rights?frame=001." Scene 123 includes an <sla> element that identifies a Service Level Agreement ("SLA") implemented as an XML Schema Definition ("XSD") named "timewarner.xsd" as the source of digital rights to modify and distribute the contents of scene 123. Clip 003, unlike clips 001, 002, and 003, specifies an rsrc URL, signifying that digital rights for the contents of clip 003 are not inherited, but are derived from a query to a remote database according to "www.rts.com/rights?frame=001."

Clip 002 in this example contains two frames each of which includes a modifiable part. In fact, it is the same modifiable part in each frame, part 001, which remains on display for more than a fraction of a second and is therefore represented in more than one frame. As a practical matter, such a display of a modifiable part would be included in more than two frames, although only two are used in this example for convenience of explanation. Frame 39457 has a 'psrc' attribute, standing for 'part source,' that specifies the URL www.objs.com/pixels?frame=39457,obj=001 as the source of a description of part 001, the description typically composed of a list of pixels that make up or outline the modifiable part within the frame, although that is not a limitation of the invention, and a modifiable part may be specified or identified in other ways as will occur to those of skill in the art. Frame 39458 has a psrc attribute that specifies the URL www.objs.com/pixels?frame=39458,obj=001 as the source of a description of part 001. If part 001 moves or changes shape between frames, then, despite the fact that the part number is the same, the description retrieved from www.objs.com/pixels? frame=39457,obj=001 will not be the same as the description retrieved from www.objs.com/pixels?frame=39458,obj=001.

The system of FIG. 1 includes a media product owner (312) that is coupled (116) for data communications through data communications network (100) and wired connection (136) to a distributed media library (408), through network (100) and wired connection (104) to a media parts provider (314), and through network (100) and wired connection (130) to a digital media production hub (302). A media product owner (312) is ultimately one or more individuals or companies that own digital media products. An owner's operation in systems that modify digital media content according to embodiments of the present invention, however, is highly automated. For ease of explanation in this example, therefore, the media product owner is represented by a computer (312). As the term is used here, therefore, a media product owner is an aggregation of computer hardware and software that taken together represents an owner of a digital media product in a system that modifies a digital media product according to embodiments of the present invention. Similarly, a media parts provider (314), as the term is used here, is an aggregation of computer hardware and software that represents individuals or companies that provide replacement parts for modifiable parts of digital media products in systems that modify a digital media product according to embodiments of the present invention. A distributed media library (408), as the term is used here, is an aggregation of computer hardware and software that provides data storage services for digital media products containing modifiable parts and for replacement parts in systems that modify a digital media product according to embodiments of the present invention. And a digital media production hub (302), as the term is used here, is an aggregation of computer hardware and software that modifies a digital media product according to embodiments of the present invention. The digital media production hub (302) in the example of FIG. 1 is connected for data communications to data communications network (101) through the wired connection (108).

The distributed media library is prospectively a huge aggregation of digital data encompassing massive amounts of information, entertainment media, educational media, interactive media, stateful online video games with multiple players, business applications, and so on. The data communications coupling between the distributed media library and the digital production hub is termed an 'operative coupling' in this specification, so called because the operative coupling is implemented so that function calls from the application level in the digital media production hub for retrieving digital media products or replacement parts are implemented as local function calls—so that application programs in the digital media production hub are unaware of the actual structure of the distributed media library, including being unaware of the location, physically or in cyberspace, of components of the library. That is, the operative coupling abstracts services of the library so that they can be accessed as function calls by applications of the digital media production hub. Such abstraction of library services may be achieved, for example, by:

- implementing the operative coupling with application servers in a multi-tiered, client-server architecture, so that function calls to retrieve digital media products or replacement parts from the library appear to applications in the digital media production hub to be ordinary function calls in a programming language such as C, C++, or JAVA,
- implementing the operative coupling with web services, describing library services in WSDL (Web Services Description Language), registering library services in a UDDI (Universal Description, Discovery, and Integration) directory, implementing calls to the library as SOAP (Simple Object Access Protocol) or HTTP (HyperText Transfer Protocol) messages,
- implementing the operative coupling with a grid computing architecture, allocating library resources in accordance with Service Level Agreements ('SLAs'), or
- implementing the operative coupling in other ways as will occur to those of skill in the art.

In the example of FIG. 1, the media product owner (312) prepares the digital media product (328) for use in modifying a digital media product according to embodiments of the present invention by making one or more parts of the digital media content modifiable, identifying them as such as described above with regard to the example of the James Bond movie, and specifying digital rights for modification of each modifiable part and digital rights for the distribution of the digital media product after modification. The digital product owner (312) then stores the digital media product (328) in a distributed media library, including storing information describing the modifiable part (332) of the digital media product and the digital grant of rights (324) to modify and distribute the digital media product. The media parts provider (314) stores the replacement part (334) in the distributed media library (408), including storing a digital grant of rights (336) to use the replacement part (334) to modify the digital media product (328) and a digital grant of rights (338) to distribute the replacement part (338) with the digital media product (328).

The digital media production hub (302) produces, from users' (138) digital expressions of preferences (306), information (305) describing a user community's preference for replacing the modifiable part (332) of the digital media product (328) with a replacement part (334). A user community is an aggregation of users (138) or consumers having at least one or more preferences in common. There are two user communities (330) depicted in the example of FIG. 1. One user community (330) includes two users (138) with one user connected for data communications to the data communications network (101) via mobile phone (114) and wireless connection (102) and another user connected for data communications to the data communications network (101) via a laptop (118) and a wireless connection (106). The other user community (330) also includes two users (138) with one user connected for data communications to the data communications network (101) via a personal computer (126) and wired connection (110) and the other user connected for data communications to the data communications network (101) via a personal digital assistant ('PDA') (128) and wireless connection (112). The presence or existence of a user community may be express, as in the National Rifle Association for example, or implicit, as in a data mining cluster. There is no requirement that members of a user community have any awareness of membership. Members of the NRA no doubt are aware of their membership in that user community; members of a community identified only as a data mining cluster likely do not know that they are members. Expressions of preference need not be overt; they can be implicit. "I like red Ford convertibles" is an example of an overt expression of preference. Purchasing a red Ford convertible is an example of an implicit expression of preference. The digital media production hub may derive expressions of preference, overt and implicit, from many resources, web logs ('blogs'), records of online purchases, user demographics, patterns of web navigation, email content, and many other resources as will occur to those of skill in the art. In the system of FIG. 1, users' digital expressions of preferences (306) are stored in one or more world wide web (134) servers connected for data communications to the data communications network (101) through wired connection (132).

The digital media production hub (302) operates by receiving, from a media product owner (312), the digital media product (328) and a digital grant of rights (324) to modify and distribute the digital media product. The digital media production hub (302) may carry out the receiving of the digital media product (328) and the digital grant of rights (324) by retrieving, from the distributed media library (408), the digital media product (328) and the digital grant of rights (324) to modify and distribute the digital media product—where they were previously deposited by the media product owner (312).

Also in the example of FIG. 1, the digital media production hub (302) operates by receiving, from a media parts provider (314), at least one replacement part (334), a digital grant of rights (336) to use the replacement part (334) to modify the digital media product (328), and a digital grant of rights (338) to distribute the replacement part (334) with the digital media product (328). The digital media production hub (302) may carry out the receiving of the replacement part by retrieving, from the distributed media library (408), the replacement part (334), the digital grant of rights (336) to use the replacement part to modify the digital media product, and the digital grant of rights (338) to distribute the replacement part with the digital media product. That is, the digital media production hub (302) may retrieve the replacement part (334), the digital grant of rights (336) to use the replacement part to modify the digital media product, and the digital grant of rights (338) to distribute the replacement part with the digital media product from the distributed media library (408)—where they were previously deposited by the media parts provider (314).

Having acquired the digital media product (334) and the replacement part (328) along with the pertinent digital grants of rights (324, 336, 338), the digital media production hub (302) replaces the modifiable part with the replacement part in accordance with the information describing the user community preference and the digital grants of rights. The replacement is carried out in dependence upon the information describing the user community preference because it is the information describing the user community preference that indicates the desirability or usefulness of making the replacement in the first place. The replacement is carried out in dependence upon the digital grants of rights in that the digital grants of rights specify the permitted sources and uses of all the digital media content (340), including the modifiable part (332) and the replacement part (334)—which itself becomes part of the digital media content (340) when it replaces the modifiable part (332). Such digital grants of rights to modify and distribute the digital media product may include, for example:

identification of one or more modifiable parts of the digital content;
  identification of one or more specific entities authorized to modify modifiable parts of the digital content;
  specification of a scope of authorized modifications for modifiable parts of the digital content;
  specification of license fees for modification of modifiable parts of the digital content to be distributed in the digital media product;
  specification of requirements for review and approval of modifications; and
  other grants and limitations on rights as may occur to those of skill in the art.

The arrangement of the media parts provider (314), the media product owner (312), the distributed media library (408), the digital media production hub (302), the user communities (330), the networks (100, 101), and other apparatus and subsystems making up the exemplary system illustrated in FIG. 1 are for explanation, not for limitation. Data processing systems useful for modifying a digital media product according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
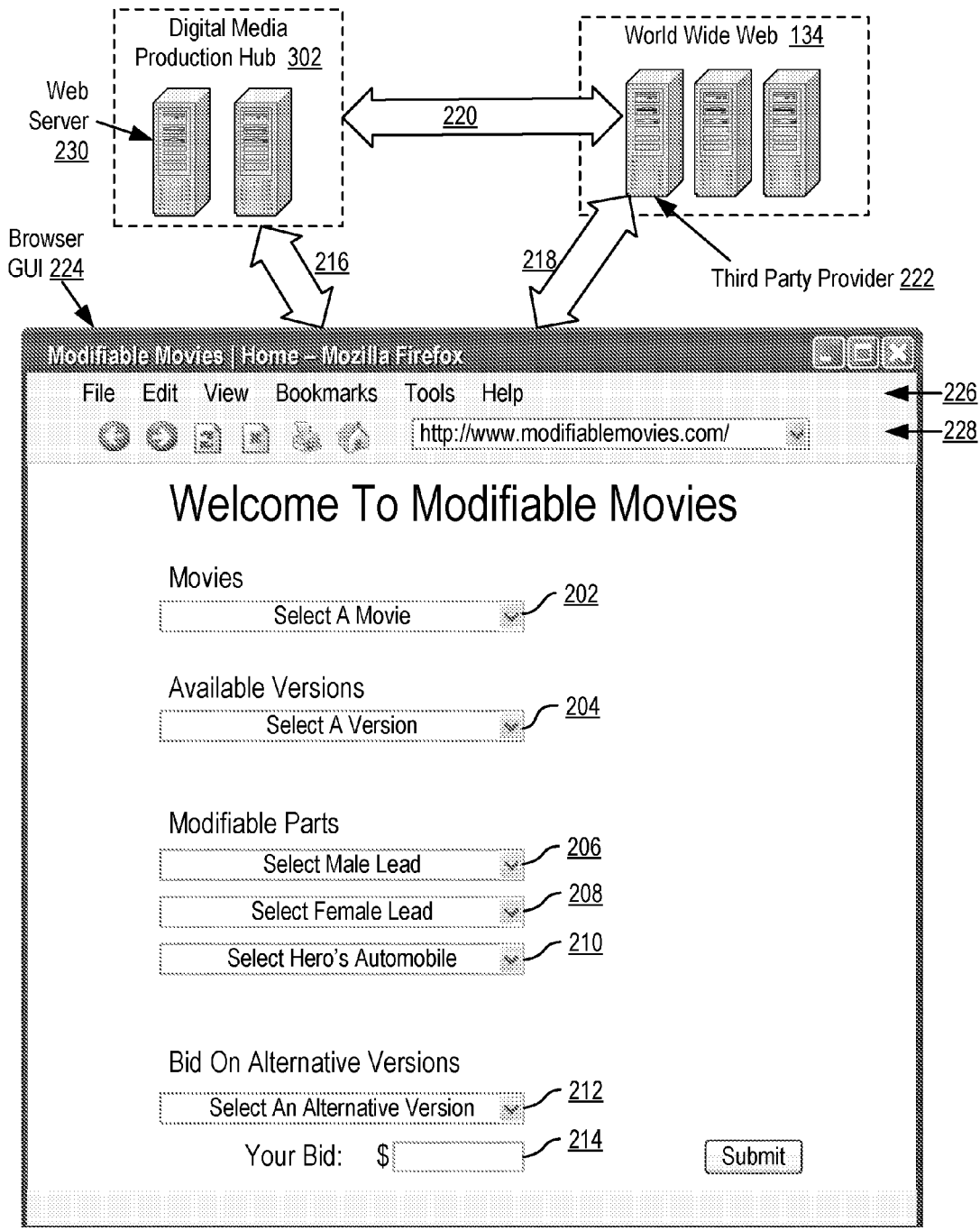
FIG. 2 sets forth a diagram of an example graphical user interface ('GUI') useful for communicating with a digital media production hub that modifies a digital media product according to embodiments of the present invention.

For further explanation, FIG. 2 sets forth a diagram of an example graphical user interface ('GUI') (224) useful for communicating with a digital media production hub (302) that modifies a digital media product according to embodiments of the present invention. The GUI (224) in this example is a GUI of a client-side data communications program, in particular, a browser. The browser GUI (224) may provide communications more or less directly with the digital media production hub through, for example, networked data communications (216) with a web server (230) integrated within the digital media hub (302). Or the browser GUI (224) may provide communications more indirectly (218, 220) with the digital media production hub (302) through, for example, networked data communications (218) with a third party provider (222) anywhere on the World Wide Web (134), where the third party provider (134) is implemented as a web server whose back end communicates with the digital media production hub (302) through an operative coupling (220) that may be implemented, for example, as:

a client-server architecture, so that function calls to communicate with the digital media production hub appear to applications in the third party provider to be ordinary function calls in a programming language such as C, C++, or JAVA,
  one or more web services described in WSDL, registered in a UDDI directory, implementing calls to the digital media production hub (302) as SOAP or HTTP messages,
  a grid computing architecture with resources allocated in accordance with SLAs, or
  other implementations as will occur to those of skill in the art.

The example browser GUI (224) of FIG. 2 includes a horizontal menu (226) containing menu items for control of the browser, "File," "Edit," "View," and so on. The example browser GUI (224) of FIG. 2 includes a toolbar (228) that in turn includes browser control button or icons for browser navigation, "Back," "Forward," "Refresh," "Stop," and so on. The browser in this example has been navigated to a website named "Modifiable Movies," from which a user or consumer can, among other things, order a movie that has been modified according to embodiments of the present invention.

The example browser GUI (224) of FIG. 2 includes a pull down menu (202) through which a user may select a movie for download or streaming display from the digital media production hub (302). A 'movie' in this example represents a digital media product that includes digital media content in the form of digital video, including at least one modifiable part amenable to modification with replacement by a replacement part. The browser GUI (224) also provides a selection menu (204) for various versions of a selected movie. The digital media production hub (302), optionally given sufficient replacement parts and grants of digital rights, may produce more than one version of a movie among which versions various modifiable parts are replaced with differing replacement parts—so that multiple versions may be produced with a different male lead in each version, for example.

In the example of FIG. 2, the digital media production hub can accept a request from a consumer for an alternative version of a digital media product in which a modifiable part is replaced with a specifically requested replacement part. The browser GUI (224) provides data entry fields, pull down menus (206, 208, 210) that enable a user or consumer to formulate such a request and send it to the digital media production hub (302). In this example, the modifiable parts identified for possible replacement at user request are the male lead (206), female lead (208), and the hero's automobile (210). With regard to GoldenEye, a user could request replacement of Bond's BMW by an Aston Martin, for example. The modifiable parts amenable to replacement in this example are three (206, 208, 210), because a movie selected in this example contained three parts designated as modifiable and accompanied by grants of digital rights to modify and distribute the modifications. The number three, of course, is not a limitation of the present invention. In fact, digital media products may have any number of modifiable parts as may occur to those of skill in the art. The browser GUI (224) may be programmed to display a data entry field for each modifiable part. In this example, there are three (206, 208, 210). When the next movie is selected by the consumer, there may be four, five, six, and so on, according to the modifiable parts structure of the selected movie.

In the example of FIG. 1, the digital media production hub can deliver a digital media product, in which one or more modifiable parts are replaced with replacement parts, by streaming the product from the digital media production hub to a consumer. The streaming delivery may be from the hub to a consumer's laptop or desktop computer, to a wireless handheld device, to a set-top box on a television set, and so on. The streaming may be implemented by use of any of a number of data communications protocols, SIP, TCP, IP, HTTP, VOIP, and so on, as will occur to those of skill in the art. During such a streaming delivery of a product, the digital media production hub can accept from a consumer a request for a modification of the digital media product in which a modifiable part is replaced with a specifically requested replacement part. Then, during the streaming delivery, the digital media production hub can replace the replacement part with the specifically requested replacement part—on the fly, as it were, in real time. In this example, the browser GUI (224) provides data entry fields, pull down menus (206, 208, 210), described in more detail above, that enable a user or consumer to formulate such a request and send it to the digital media production hub (302).

As mentioned above, the digital media production hub (302) may derive expressions of preference, overt and implicit, from many resources, web logs ('blogs'), records of online purchases, user demographics, patterns of web navigation, email content, and many other resources as will occur to those of skill in the art. Users' digital expressions of preferences may also include overt assertions of a willingness to pay for a certain version of a movie which may not yet exist. Such overt assertions are referred to in this specification as 'bids.' Users' digital expressions of preferences may include such bids representing amounts of money one or more users are willing to pay for a version of the digital media product in which a modifiable part is replaced with a replacement part. For business reasons, with which the digital media production hub may be programmed by, for example, business rules expressed in the Business Process Execution Language ('BPEL'), the digital media production hub can replace the modifiable part with the replacement part by replacing the modifiable part with the replacement part only when the total amount of money represented by all such bids exceeds a predetermined threshold value. Such a threshold value may be determined, for example, according to the cost of producing the version represented by any particular replacement of modifiable parts, volume requirements, required minimum profit margins, market size as indicated by the number of bids received, and so on. In the example of FIG. 2, the browser GUI (224) provides data entry fields, a pull down menu (212) and a data entry field (214), that enable a user or consumer to formulate a bid on an alternative version of a digital media product and submit the bid to the digital media production hub (302).

Modifying a digital media product in accordance with the present invention is generally implemented with computers, that is, with automated computing machinery. In the system of FIG. 1, for example, the media parts provider (314), the media product owner (312), the digital media production hub (302), the user communities (330), and the communications networks (100, 101) all are implemented to some extent at least as computers. For further explanation, therefore, FIG. 3 sets forth a block diagram of automated computing machinery comprising an exemplary computer (152) useful in modifying a digital media product according to embodiments of the present invention. The computer (152) of FIG. 3 includes at least one computer processor (156) or 'CPU' as well as random access memory (168) ('RAM') which is connected through a high speed memory bus (166) and bus adapter (158) to processor (156) and to other components of the computer.

Figure 3:
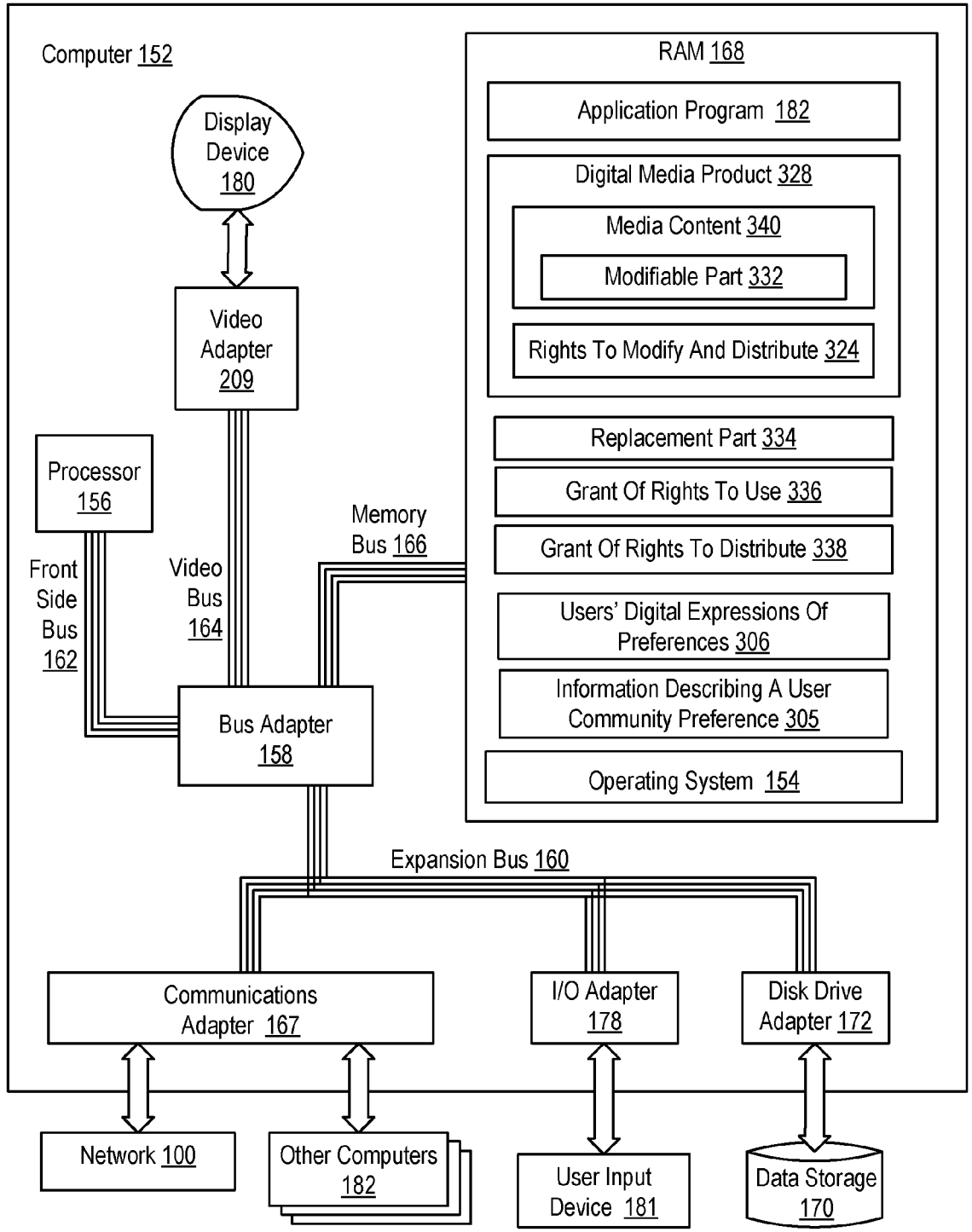
FIG. 3 sets forth a block diagram of automated computing machinery comprising an exemplary computer useful in modifying a digital media product according to embodiments of the present invention.

Stored in RAM in the example of FIG. 3 is an application program (182), a module of computer program instructions that causes the computer (152) in the example of FIG. 3 to operate as a digital media production hub and modify a digital media product (328), where the digital media product includes digital media content (340) and the digital media content includes a modifiable part (332), by producing, from users' digital expressions of preferences (306), information (305) describing a user community's preference for replacing the modifiable part (332) of the digital media product (328) with a replacement part (334); receiving, from a media product owner, the digital media product (328) and a digital grant of rights (324) to modify and distribute the digital media product; receiving, from a media parts provider, at least one replacement part (334), a digital grant of rights (336) to use the replacement part to modify the digital media product, and a digital grant of rights (338) to distribute the replacement part with the digital media product; and replacing, in accordance with the information (305) describing the user community preference and the digital grants (324, 336, 338) of rights, the modifiable part (332) with the replacement part (334).

Also stored in RAM, in the example of FIG. 3, is an operating system (154). Operating systems useful in computers that modify a digital media product according to embodiments of the present invention include UNIX™, Linux™, Microsoft NT™, AIX™, IBM's i5/OS™, and others as will occur to those of skill in the art. The operating system (154), application program (182), the digital media product (328), the replacement part (334), and so on, in the example of FIG. 3, are illustrated disposed in RAM (168), but many components of such software typically are stored in non-volatile memory also, for example, on a disk drive (170).

The computer (152) of FIG. 3 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful in computers according to embodiments of the present invention include the Intel Northbridge, the Intel Memory Controller Hub, the Intel Southbridge, and the Intel I/O Controller Hub. Examples of expansion buses useful in computers according to embodiments of the present invention include Industry Standard Architecture ('ISA') buses and Peripheral Component Interconnect ('PCI') buses.

The computer (152) of FIG. 3 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer (152) of FIG. 3 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for modifying a digital media product according to embodiments of the present invention include modems for wired dial-up communications, Ethernet (IEEE 802.3) adapters for wired data communications network communications, and 802.11 adapters for wireless data communications network communications.

Figure 4:
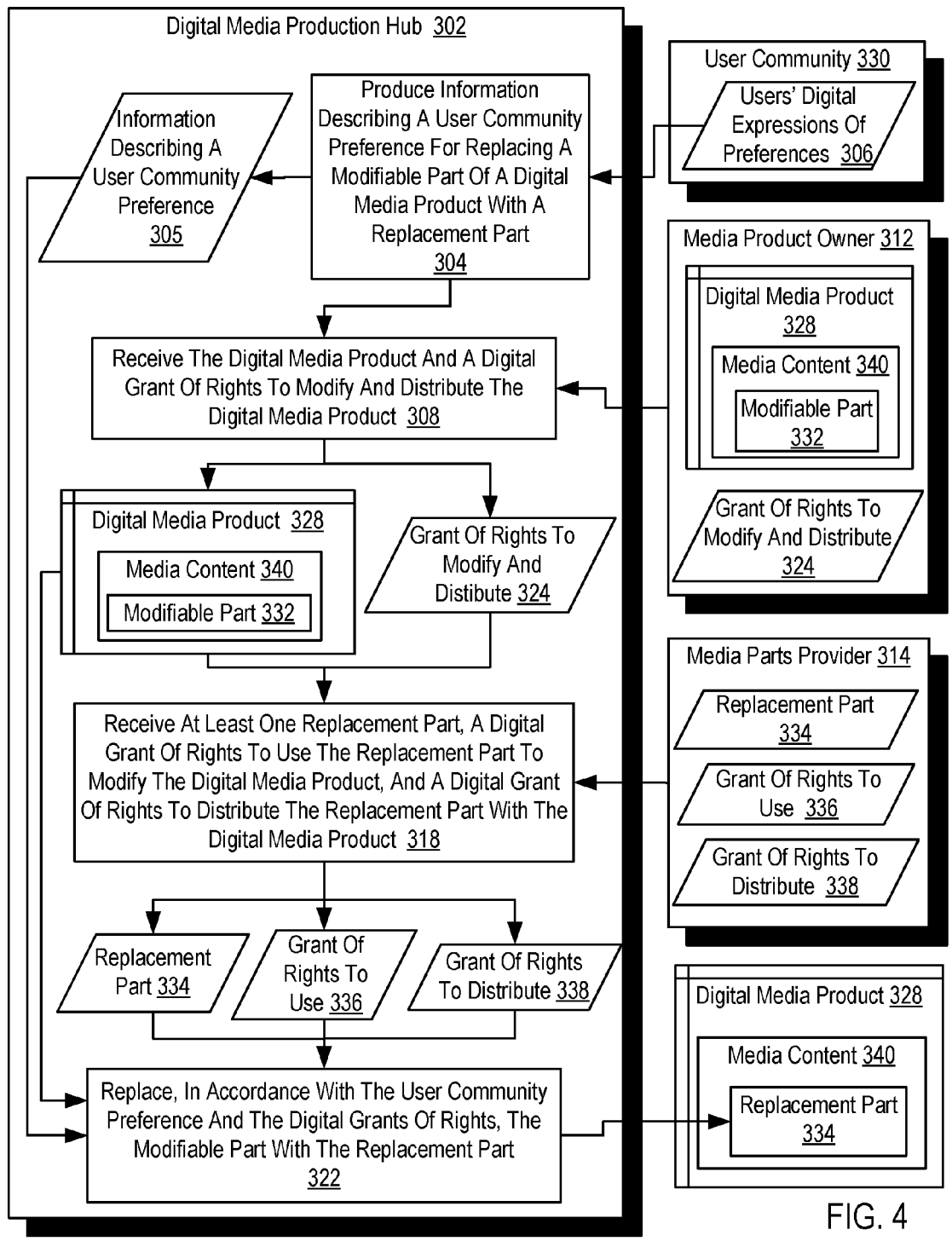
FIG. 4 sets forth a flow chart illustrating an exemplary method for modifying a digital media product according to embodiments of the present invention.

For further explanation, FIG. 4 sets forth a flow chart illustrating an exemplary method for modifying a digital media product (328) according to embodiments of the present invention. In the method of FIG. 4, the digital media product (328) includes digital media content (340), and the digital media content including a modifiable part (332). The method of FIG. 4 includes producing (304), by a digital media production hub (302) from users' digital expressions of preferences (306), information (305) describing a user community's preference for replacing the modifiable part (332) of the digital media product (328) with a replacement part (334). The digital media production hub is the aggregation of computer hardware and software described above. The digital media production hub (302) may acquire users' expressions of preference, overt or implicit, from many resources, web logs ('blogs'), records of online purchases, user demographics, patterns of web navigation, email content, and many other resources as will occur to those of skill in the art. The digital media production hub (302) may produce the information (305) describing a user community's preference for replacing the modifiable part (332) of the digital media product (328) with a replacement part (334) in various forms, including the following example XML format:

```
<userCommunity id= "001">
    < digitalMediaProduct id= "54673">Action Movie
        <preference id= "54368">
            <modifiablePart id= "001">Male Lead
            <replacementPart id= "001">Tom Cruise
        </preference>
        <preference id= "54369">
            <modifiablePart id= "002">Soft Drink Container
```

-continued

```
            <replacementPart id= "002">PEPSI
        </preference>
        ...
    </digitalMediaProduct>
    ...
</userCommunity>
```

This example XML sets forth information describing preferences of user community 001 for replacing modifiable parts of an action movie with replacement parts. The information describes a preference numbered 54368 for replacing the male lead with Tom Cruise, and the information also describes a preference for replacing a soft drink container with a PEPSI™ container. The information describes only two preferences for only one digital media product, the action movie, although neither of these numbers are limitations of the invention. In fact, information describing user community preferences may be provided by a digital media production hub for any number of preferences for any number of digital media products as may occur to those of skill in the art.

The method of FIG. 4 also includes receiving (308), in the digital media production hub from a media product owner (312), the digital media product (328) and a digital grant of rights (324) to modify and distribute the digital media product (328). The method of FIG. 4 also includes receiving (318), by the digital media production hub (302) from a media parts provider (314), at least one replacement part (334), a digital grant of rights (336) to use the replacement part to modify the digital media product, and a digital grant of rights (338) to distribute the replacement part (334) with the digital media product (328). The method of FIG. 4 also includes replacing (322), by the digital media production hub (302) in accordance with the information (305) describing the user community preference and the digital grants of rights (324, 336, 338), the modifiable part (332) with the replacement part (334).

Figure 5:
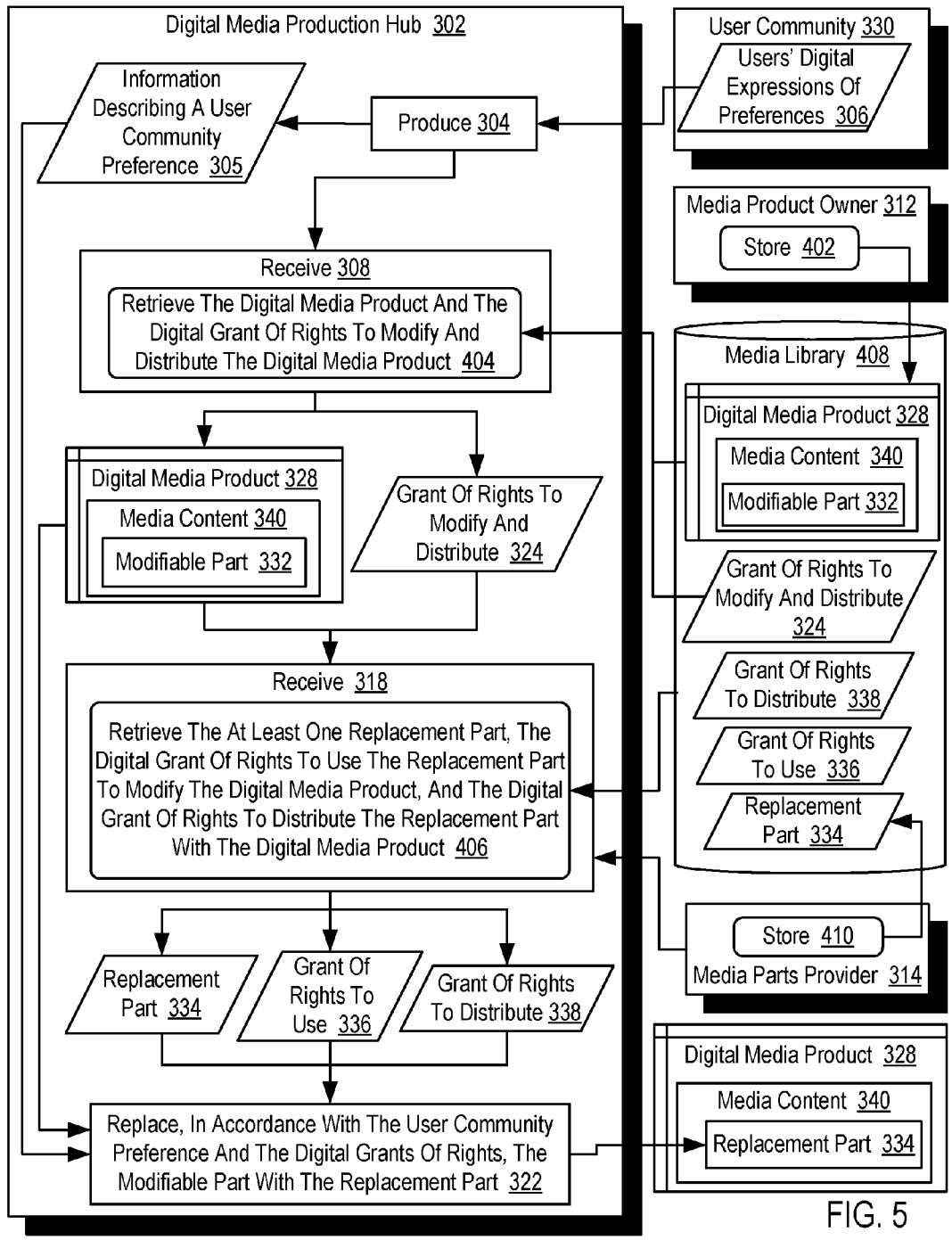
FIG. 5 sets forth a flow chart illustrating a further exemplary method for modifying a digital media product according to embodiments of the present invention.

For further explanation, FIG. 5 sets forth a flow chart illustrating a further exemplary method for modifying a digital media product according to embodiments of the present invention. The method of FIG. 5 is similar to the method of FIG. 4, including as it does the digital media production hub's (302) producing (304) information (305) describing a user community's preference for replacing a modifiable part (332), a hub's receiving (308) a digital media product (328) that includes a modifiable part and a digital grant of rights (324) to modify and distribute the digital media product (328), the hub's receiving (318) a replacement part (334) and digital grants of rights (336, 338) to use and distribute the replacement part, and the hub's replacing (322) the modifiable part (332) with the replacement part (334), all of which operate in a similar manner as described above. The method of FIG. 5 also includes a distributed media library (408) that is operatively coupled to the digital media production hub (302). The operative coupling may be implemented as:

a client-server architecture, so that function calls to communicate with the library appear to applications in the hub to be ordinary function calls in a programming language such as C, C++, or JAVA, one or more web services described in WSDL, registered in a UDDI directory, implementing calls to the library as SOAP or HTTP messages, a grid computing architecture with resources allocated in accordance with SLAs, or other implementations as will occur to those of skill in the art.

In addition to the steps mentioned above that the method of FIG. 5 shares with the method of FIG. 4, the method of FIG. 5 also includes storing (402), by the media product owner (312), the digital media product (328) in a distributed media library (408) along with the modifiable part (332) of the digital media product and the digital grant of rights (324) to modify and distribute the digital media product. Storing (402) the digital media product (328) in a distributed media library (408) is optional within the overall context of the present invention. The digital media product (328) may alternatively, for example, be provided by the digital media owner directly from the owner or the owner's computer system to the digital media production hub in a predetermined data format—or in other ways as will occur to those of skill in the art.

In the example of FIG. 5, however, where the owner has made the digital media product available to the digital media production hub through the distributed media library, receiving (308) the digital media product is carried out by retrieving (404), by the digital media production hub (302) from the distributed media library (408), the digital media product (328) and the digital grant of rights (324) to modify and distribute the digital media product.

The method of FIG. 5 also includes storing (410) by the media parts provider (314) the replacement part (334) in the distributed media library (408), along with the digital grant of rights (336) to use the replacement part to modify the digital media product and the digital grant of rights (338) to distribute the replacement part with the digital media product. Again, the replacement parts provider can provide the replacement part to the hub directly from the replacement parts provider's own computer system or in other ways as will occur to those of skill in the art. In the example of FIG. 5, however, where the replacement parts provider (314) has stored (410) the replacement part (334) in the distributed media library (408), receiving (318) the replacement part is carried out by retrieving (406), by the digital media production hub (302) from the distributed media library (408), the replacement part (334), the digital grant of rights (336) to use the replacement part to modify the digital media product, and the digital grant of rights (338) to distribute the replacement part with the digital media product.

For further explanation, FIG. 6 sets forth a line drawing illustrating an example data structure representing a digital grant (424) of rights to modify and distribute a digital media product according to embodiments of the present invention. The example of a digital grant of rights of FIG. 6 includes the following grants and limitations of rights:
- an identification of one or more modifiable parts of the digital content of a digital media product (502);
- identification of one or more specific entities authorized to modify modifiable parts of the digital content (504);
- specification of a scope of authorized modifications for modifiable parts of the digital content (506);
- specification of license fees for modification of modifiable parts of the digital content to be distributed in the digital media product (508); and
- specification of requirements for review and approval of modifications (510).

For further explanation, consider the following example, expressed in XML, of a digital grant of rights to modify and distribute a digital media product according to embodiments of the present invention:

```
<rights product_ID="98756">Action Movie
    <modifiablePart id="001">Male Lead
```

-continued

```
        <replacementPartProvider id="657">
            <scope>Tom Cruise</scope>
            <fee>Fee Schedule 2345</fee>
            <review>Owner, Agent</review>
        </replacementPartProvider>
        <replacementPartProvider id="5467">
            <scope>Denzel Washington</scope>
            <fee>Fee Schedule 9807</fee>
            <review>Owner, Agent</review>
        </replacementPartProvider>
    </modifiablePart>
    <modifiablePart id="002">Generic Soft Drink Container
        <replacementPartProvider id="543">
            <scope>COCA COLA</scope>
            <fee>Fee Schedule 324</fee>
            <review>Owner</review>
        </replacementPartProvider>
        <replacementPartProvider id="761">
            <scope>PEPSI</scope>
            <fee>Fee Schedule 768</fee>
            <review>Replacement Parts Provider</review>
        </replacementPartProvider>
    </modifiablePart>
    ...
</rights>
```

This XML example, referred to sometimes in this specification as 'the Action Movie example,' is an example of a digital grant of rights to modify and distribute a digital media product, that is, an action movie, according to embodiments of the present invention. The Action Movie example includes identification of two modifiable parts of the digital content of the action movie identified by <modifiablePart> elements as modifiable parts 001 and 002 respectively. Modifiable part 001 represents the parts of the digital media content depicting the male lead in the action movie. A <replacementPartProvider> element for modifiable part 001 identifies replacement parts provider 657 as a specific entity authorized to modify modifiable part 001. The scope of authorized modifications of modifiable part 001 by replacement parts provider 657 is limited by a <scope> element to replacing the male lead in the action movie with replacement parts representing images of Tom Cruise—presumably because replacement parts provider 657 is properly licensed for Tom Cruise replacement parts. License fees are specified for modification of modifiable part 001 with Tom Cruise replacement parts by the <fee> element to payment of license fees according to Fee Schedule 2345. The <review> element for replacement parts provider 657 specifies the requirement of review and approval by the owner of the action movie and also by Tom Cruise's agent of modifications effected by replacement parts provider 657.

In the Action Movie example, in addition to the deification of replacement parts provider 657 as an entity authorized to modify the action movie, a further <replacementPartProvider> element for modifiable part 001 identifies replacement parts provider 5467 as a specific entity authorized to modify modifiable part 001. The scope of authorized modifications of modifiable part 001 by replacement parts provider 5467 is limited by a <scope> element to replacing the male lead in the action movie with replacement parts representing images of Denzel Washington—presumably because replacement parts provider 5467 is properly licensed for Denzel Washington replacement parts. License fees are specified for modification of modifiable part 001 with Denzel Washington replacement parts by the <fee> element to payment of license fees according to Fee Schedule 9807. The <review> element for replacement parts provider 5467 specifies the requirement of review and approval by the owner of the action movie and also by Denzel Washington's agent of modifications effected by replacement parts provider 5467.

Modifiable part 002 represents the parts of the digital media content depicting a generic soft drink container in the action movie. A <replacementPartProvider> element for modifiable part 002 identifies replacement parts provider 543 as a specific entity authorized to modify modifiable part 002. The scope of authorized modifications of modifiable part 002 by replacement parts provider 543 is limited by a <scope> element to replacing the generic soft drink container in the action movie with replacement parts representing images of COCA COLA™ containers—presumably because replacement parts provider 543 is properly licensed for COCA COLA replacement parts. License fees are specified for modification of modifiable part 002 with COCA COLA replacement parts by the <fee> element to payment of license fees according to Fee Schedule 324. The <review> element for replacement parts provider 543 specifies the requirement of review and approval by the owner of the action movie of modifications effected by replacement parts provider 543.

In the Action Movie example, in addition to the deification of replacement parts provider 543 as an entity authorized to modify the action movie, a further <replacementPartProvider> element for modifiable part 002 identifies replacement parts provider 761 as a specific entity authorized to modify modifiable part 002. The scope of authorized modifications of modifiable part 002 by replacement parts provider 761 is limited by a <scope> element to replacing the generic soft drink container in the action movie with replacement parts representing images of PEPSI™ containers—presumably because replacement parts provider 761 is properly licensed for PEPSI replacement parts. License fees are specified for modification of modifiable part 002 with PEPSI replacement parts by the <fee> element to payment of license fees according to Fee Schedule 768. The <review> element for replacement parts provider 761 specifies the requirement of review and approval by the owner of the action movie of modifications effected by replacement parts provider 761.

Figure 7:
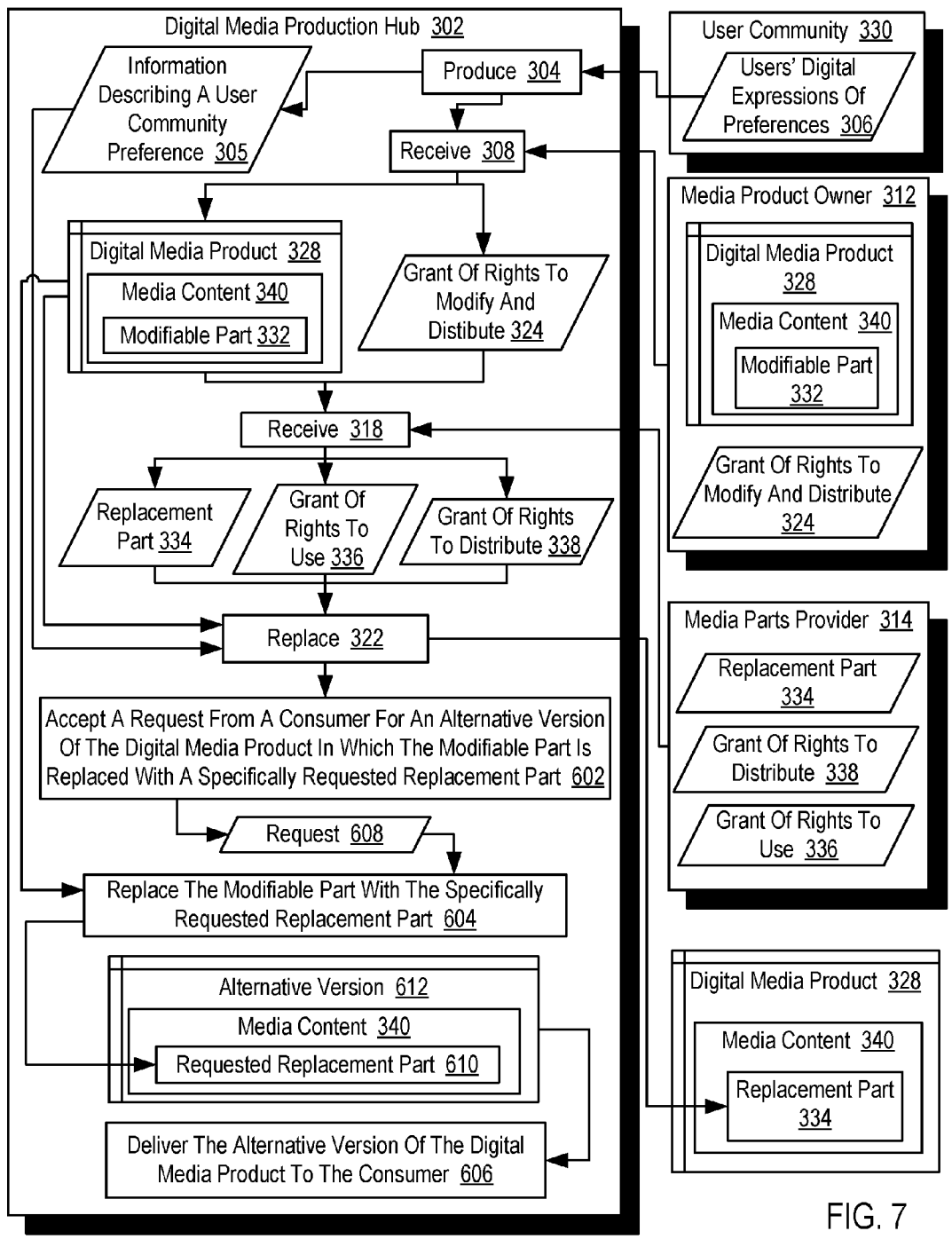
FIG. 7 sets forth a flow chart illustrating a further exemplary method for modifying a digital media product according to embodiments of the present invention.

For further explanation, FIG. 7 sets forth a flow chart illustrating a further exemplary method for modifying a digital media product according to embodiments of the present invention. The method of FIG. 7 is similar to the method of FIG. 4, including as it does the digital media production hub's (302) producing (304) information (305) describing a user community's preference for replacing a modifiable part (332), a hub's receiving (308) a digital media product (328) that includes a modifiable part and a digital grant of rights (324) to modify and distribute the digital media product (328), the hub's receiving (318) a replacement part (334) and digital grants of rights (336, 338) to use and distribute the replacement part, and the hub's replacing (322) the modifiable part (332) with the replacement part (334), all of which operate in a similar manner as described above.

The method of FIG. 7, however, also includes accepting (602) by the digital media production hub (302) a request (608) from a consumer for an alternative version (612) of the digital media product in which the modifiable part (332) is replaced with a specifically requested replacement part (610). Either the hub itself (302, 216 on FIG. 2) or a third party provider (222, 218, 220 on FIG. 2) may make available a user interface (224 on FIG. 2) through which a consumer may request an alternative version of the digital media product.

The method of FIG. 7 also includes replacing (604) by the digital media production hub (302) the modifiable part (332) with the specifically requested replacement part (610). Note that replacing (604) by the digital media production hub (302) the modifiable part (332) with the specifically requested replacement part (610) in this example is an alternative to the step of replacing (322) in accordance with the information (305) describing the user community preference and the digital grants of rights (324, 336, 338), the modifiable part (332) with the replacement part (334). In this example, replacing (604) by the digital media production hub (302) the modifiable part (332) with the specifically requested replacement part (610) is not affected by information (305) describing user community preference.

The method of FIG. 7 also includes delivering (606) the alternative version (612) of the digital media product (328) from the digital media production hub (302) to the consumer. Delivering (606) the alternative version (612) of the digital media product (328) from the digital media production hub (302) to the consumer may be carried out by any digital communications methods as will occur to those of skill in the art, including, for example, data communications with TCP/IP, HTTP, WAP, or HDTP.

Figure 8:
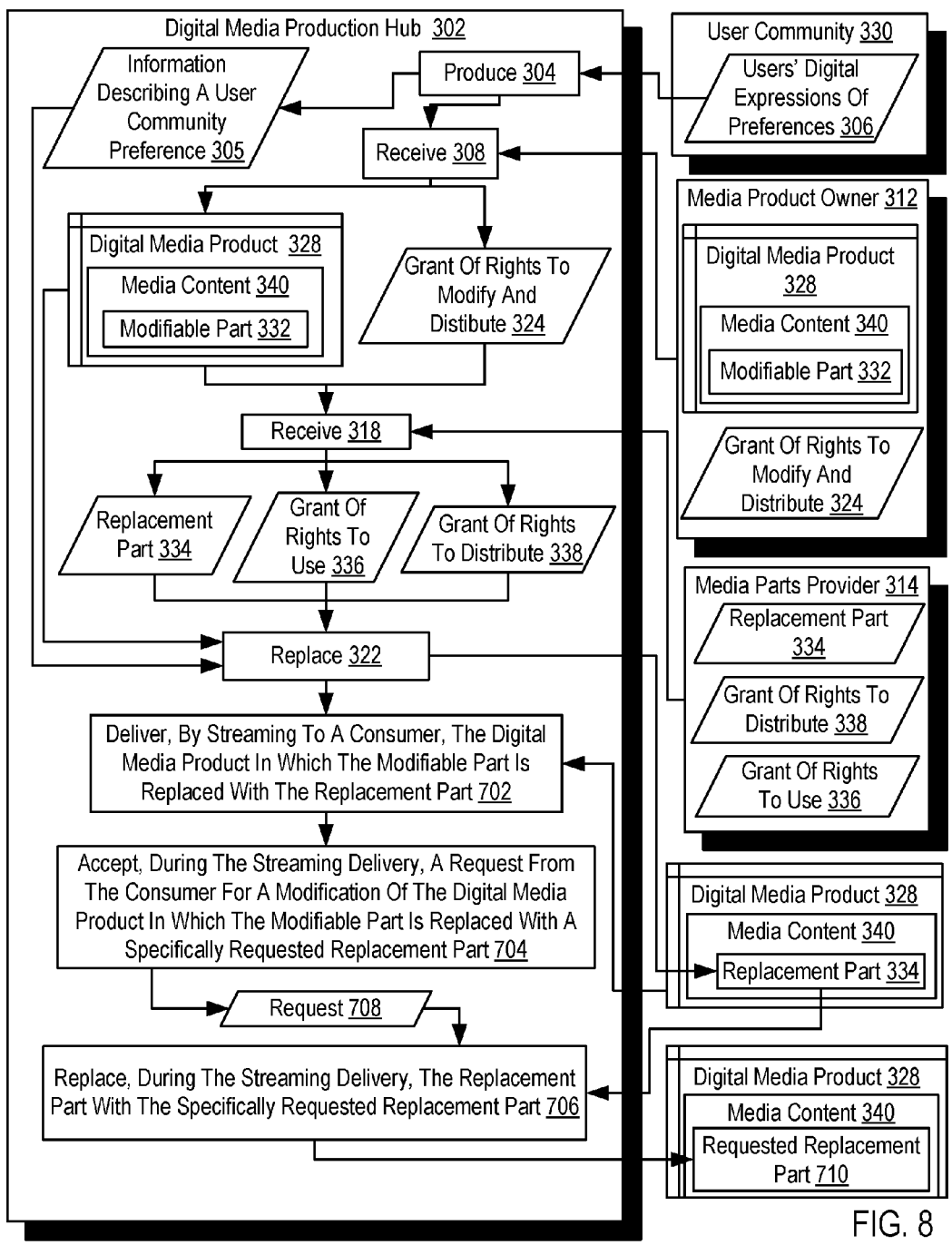
FIG. 8 sets forth a flow chart illustrating a further exemplary method for modifying a digital media product according to embodiments of the present invention.

For further explanation, FIG. 8 sets forth a flow chart illustrating a further exemplary method for modifying a digital media product according to embodiments of the present invention. The method of FIG. 8 is similar to the method of FIG. 4, including as it does the digital media production hub's (302) producing (304) information (305) describing a user community's preference for replacing a modifiable part (332), a hub's receiving (308) a digital media product (328) that includes a modifiable part and a digital grant of rights (324) to modify and distribute the digital media product (328), the hub's receiving (318) a replacement part (334) and digital grants of rights (336, 338) to use and distribute the replacement part, and the hub's replacing (322) the modifiable part (332) with the replacement part (334), all of which operate in a similar manner as described above.

The method of FIG. 8, however, also includes delivering (702), by streaming from the digital media production hub (302) to a consumer, the digital media product (328) in which the modifiable part (332) is replaced with the replacement part (334). A streaming delivery of digital media content is continuously received by, and normally displayed to, an end-user or consumer while the digital media content is being delivered from the digital media production hub. "Streaming" refers to the delivery method rather than to the medium itself. The distinction is usually applied to media that are distributed over telecommunications networks, as most other delivery systems are either inherently streaming, such as radio or television, or inherently non-streaming, such as books, video cassettes, or audio CDs.

The method of FIG. 8 also includes accepting (704), during the streaming delivery by the digital media production hub, a request (708) from the consumer for a modification of the digital media product in which the modifiable part (332) is replaced with a specifically requested replacement part (710) and replacing (706), during the streaming delivery by the digital media production hub, the replacement part (334) with the specifically requested replacement part (710). In this way, a user may enter a request, and, if the requested replacement part is available and supportive digital grants of rights are in place, the hub can replace the replacement part with the specifically requested replacement part—on the fly, as it were, in real time. A user can change the leading man several times in the course of a single viewing a product, for example. If a user decides PEPSI would be preferable to COCA COLA, the user can make that change right in the middle of a viewing of a movie. And then change right back to PEPSI, if the user wishes to do so.

Figure 9:
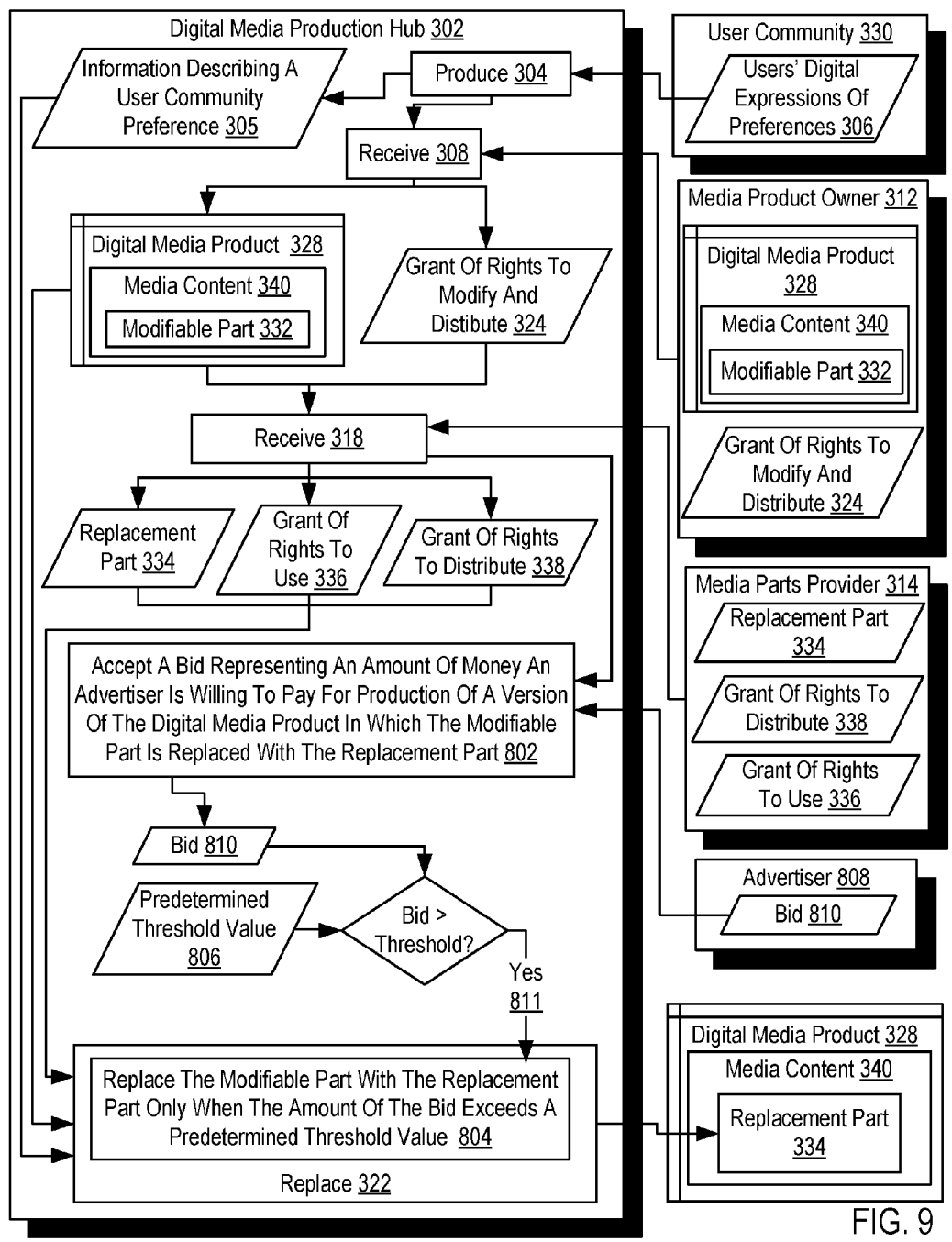
FIG. 9 sets forth a flow chart illustrating a further exemplary method for modifying a digital media product according to embodiments of the present invention.

For further explanation, FIG. 9 sets forth a flow chart illustrating a further exemplary method for modifying a digital media product according to embodiments of the present invention. The method of FIG. 9 is similar to the method of FIG. 4, including as it does the digital media production hub's (302) producing (304) information (305) describing a user community's preference for replacing a modifiable part (332), a hub's receiving (308) a digital media product (328) that includes a modifiable part and a digital grant of rights (324) to modify and distribute the digital media product (328), the hub's receiving (318) a replacement part (334) and digital grants of rights (336, 338) to use and distribute the replacement part, and the hub's replacing (322) the modifiable part (332) with the replacement part (334), all of which operate in a similar manner as described above. The method of FIG. 9, however, also includes accepting (802) from an advertiser (808) a bid (810) representing an amount of money the advertiser is willing to pay for production of a version of the digital media product in which the modifiable part (332) is replaced with the replacement part (334). In the method of FIG. 9 replacing (322) the modifiable part (332) with the replacement part (334) is carried out by replacing (804) the modifiable part (332) with the replacement part (334) only when the amount of the bid (810) exceeds (811) a predetermined threshold value (804). The process of producing information describing user community preferences and replacing modifiable parts with replacement parts in dependence upon the preferences in typical embodiments is highly automated, in preferred embodiments, entirely automated. By waiting to replace (804) the modifiable part (332) with the replacement part (334) until the amount of a bid (810) exceeds (811) a predetermined threshold value (804), the digital media production hub waits to make the replacement and thereby develop a new product until it makes economic sense to do so.

Figure 10:
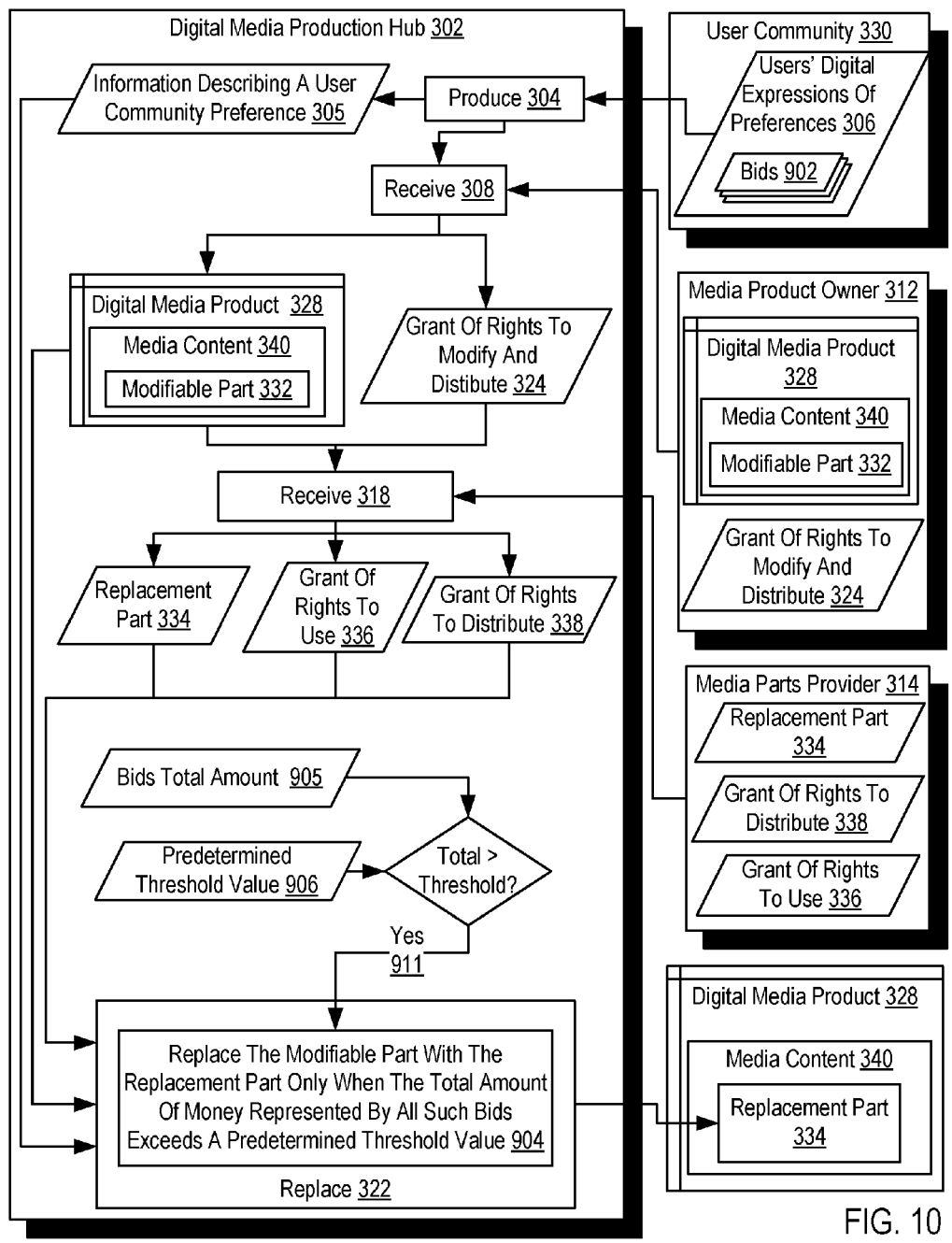
FIG. 10 sets forth a flow chart illustrating a further exemplary method for modifying a digital media product according to embodiments of the present invention.

For further explanation, FIG. 10 sets forth a flow chart illustrating a further exemplary method for modifying a digital media product according to embodiments of the present invention. The method of FIG. 10 is similar to the method of FIG. 4, including as it does the digital media production hub's (302) producing (304) information (305) describing a user community's preference for replacing a modifiable part (332), a hub's receiving (308) a digital media product (328) that includes a modifiable part and a digital grant of rights (324) to modify and distribute the digital media product (328), the hub's receiving (318) a replacement part (334) and digital grants of rights (336, 338) to use and distribute the replacement part, and the hub's replacing (322) the modifiable part (332) with the replacement part (334), all of which operate in a similar manner as described above. In the method of FIG. 10, however, the users' digital expressions of preferences (306) include bids (902) representing amounts of money one or more users are willing to pay for a version of the digital media product (328) in which the modifiable part (332) is replaced with the replacement part (334). Also in the method of FIG. 10, replacing (322) the modifiable part (332) with the replacement part (334) is carried out by replacing (904) the modifiable part (332) with the replacement part (334) only when the total amount (905) of money represented by all such bids (902) exceeds (911) a predetermined threshold value (906). The process of producing information describing user community preferences and replacing modifiable parts with replacement parts in dependence upon the preferences in typical embodiments is highly automated, in preferred embodiments, entirely automated. By waiting to replace (904) the modifiable part (332) with the replacement part (334) until the total amount (905) of money represented by all of the bids (902) exceeds (911) a predetermined threshold value (906), the digital media production hub waits to make the replacement and thereby develop a new product until it makes economic sense to do so.

Figure 11:
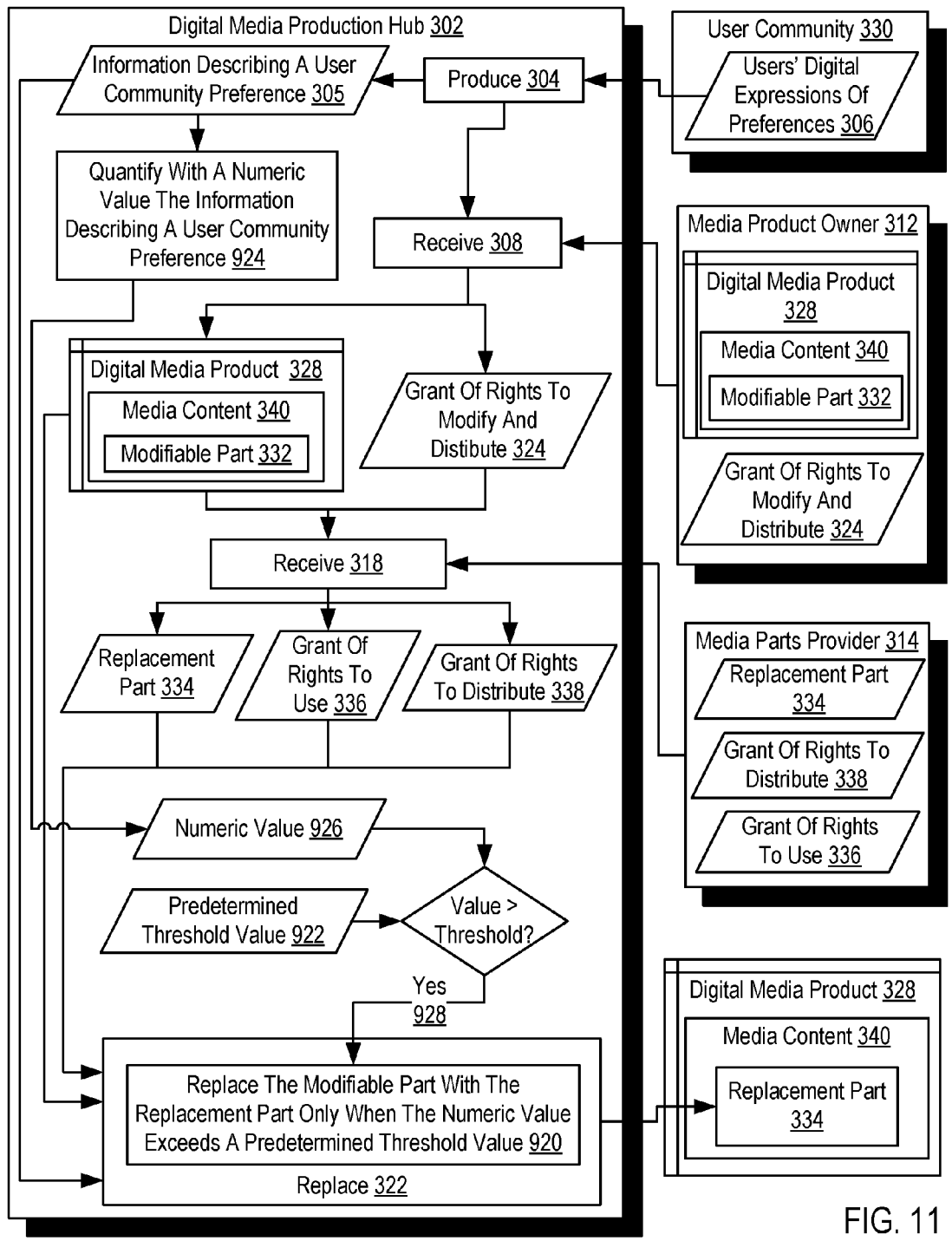
FIG. 11 sets forth a flow chart illustrating a further exemplary method for modifying a digital media product according to embodiments of the present invention.

For further explanation, FIG. 11 sets forth a flow chart illustrating a further exemplary method for modifying a digital media product according to embodiments of the present invention. The method of FIG. 11 is similar to the method of FIG. 4, including as it does the digital media production hub's (302) producing (304) information (305) describing a user community's preference for replacing a modifiable part (332), a hub's receiving (308) a digital media product (328) that includes a modifiable part and a digital grant of rights (324) to modify and distribute the digital media product (328), the hub's receiving (318) a replacement part (334) and digital grants of rights (336, 338) to use and distribute the replacement part, and the hub's replacing (322) the modifiable part (332) with the replacement part (334), all of which operate in a similar manner as described above. The method of FIG. 11, however, also includes quantifying (924) the information (305) describing a user community preference with a numeric value (926). Numeric values useful in describing a user community preference according to embodiments of the present invention include numeric values describing the size, distribution, and central tendency of data mining clusters, for example. In the method of FIG. 11, replacing (322) the modifiable part (332) with the replacement part (334) is carried out by replacing (920) the modifiable part (332) with the replacement part (334) only when the numeric value (926) exceeds (928) a predetermined threshold value (922). By waiting to replace (920) the modifiable part (332) with the replacement part (334) until a numeric value (926) describing a user community's preference exceeds (928) a predetermined threshold value (922), the digital media production hub waits to make the replacement and thereby develop a new product until it makes economic sense to do so.

Exemplary embodiments of the present invention are described largely in the context of a fully functional computer system for modifying a digital media product. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for modifying a digital media product, the digital media product comprising digital media content, the digital media content comprising digital video content including a modifiable part, the modifiable part comprising an object within a frame of the digital video content specified by a set of pixels outlining the object within the frame, the method comprising:

producing, by a digital media production hub comprising one or more modules of automated computing machinery, from users' digital expressions of preferences, information describing a user community's preference for replacing the modifiable part of the digital media product with a replacement part;

receiving, by the digital media production hub from a media product owner, the digital media product and a digital grant of rights to modify and distribute the digital media product;

receiving, by the digital media production hub from a media parts provider, at least one replacement part, a digital grant of rights to use the replacement part to modify the digital media product, and a digital grant of rights to distribute the replacement part with the digital media product; and replacing, by the digital media production hub the modifiable part with the replacement part in accordance with:

the information describing the user community preference;

the digital grant of rights to modify and distribute the digital media product;

the digital grant of rights to use the replacement part to modify the digital media product; and the digital grant of rights to distribute the replacement part with the digital media product.

2. The method of claim 1 further comprising:

storing, by the media product owner the digital media product in a distributed media library, the distributed media library operatively coupled to the digital media production hub, the distributed media library comprising information describing the modifiable part of the digital media product and the digital grant of rights to modify and distribute the digital media product;

storing by the media parts provider the replacement part in the distributed media library, the distributed media library further comprising the digital grant of rights to use the replacement part to modify the digital media product and the digital grant of rights to distribute the replacement part with the digital media product;

wherein receiving the digital media product further comprises retrieving, by the digital media production hub from the distributed media library, the digital media product and the digital grant of rights to modify and distribute the digital media product; and wherein receiving the at least one replacement part further comprises retrieving, by the digital media production hub from the distributed media library, the at least one replacement part, the digital grant of rights to use the replacement part to modify the digital media product, and the digital grant of rights to distribute the replacement part with the digital media product.

3. The method of claim 1 wherein the digital grant of rights to modify and distribute the digital media product further comprises:

identification of one or more modifiable parts of the digital content;

identification of one or more specific entities authorized to modify modifiable parts of the digital content;

specification of a scope of authorized modifications for modifiable parts of the digital content;

specification of license fees for modification of modifiable parts of the digital content to be distributed in the digital media product; and specification of requirements for review and approval of modifications.

4. The method of claim 1 further comprising:

accepting by the digital media production hub a request from a consumer for an alternative version of the digital media product in which the modifiable part is replaced with a specifically requested replacement part;

replacing by the digital media production hub the modifiable part with the specifically requested replacement part; and delivering the alternative version of the digital media product from the digital media production hub to the consumer.

5. The method of claim 1 further comprising:

delivering, by streaming from the digital media production hub to a consumer, the digital media product in which the modifiable part is replaced with the replacement part;

accepting, during the streaming delivery by the digital media production hub, a request from the consumer for a modification of the digital media product in which the modifiable part is replaced with a specifically requested replacement part;

replacing, during the streaming delivery by the digital media production hub, the replacement part with the specifically requested replacement part.

6. The method of claim 1 further comprising:

accepting from an advertiser a bid representing an amount of money the advertiser is willing to pay for production of a version of the digital media product in which the modifiable part is replaced with the replacement part;

wherein replacing the modifiable part with the replacement part further comprises replacing the modifiable part with the replacement part only when the amount of the bid exceeds a predetermined threshold value.

7. The method of claim 1 wherein:

the users' digital expressions of preferences include bids representing amounts of money one or more users are willing to pay for a version of the digital media product in which the modifiable part is replaced with the replacement part; and replacing the modifiable part with the replacement part further comprises replacing the modifiable part with the replacement part only when the total amount of money represented by all such bids exceeds a predetermined threshold value.

8. The method of claim 1 wherein:

the method further comprises quantifying with a numeric value the information describing a user community preference; and replacing the modifiable part with the replacement part further comprises replacing the modifiable part with the replacement part only when the numeric value exceeds a predetermined threshold value.

9. An apparatus for modifying a digital media product, the apparatus comprising a computer processor, a computer memory operatively coupled to the computer processor, the computer memory having disposed within it computer program instructions that when executed cause the computer processor to carry out the steps of:

producing, from users' digital expressions of preferences, information describing a user community's preference for replacing a modifiable part of a digital media product with a replacement part, the digital media product comprising digital media content, the digital media content comprising digital video content including the modifiable part, the modifiable part comprising an object within a frame of the digital video content specified by a set of pixels outlining the object within the frame;

receiving, from a media product owner, the digital media product and a digital grant of rights to modify and distribute the digital media product;

receiving, from a media parts provider, at least one replacement part, a digital grant of rights to use the replacement part to modify the digital media product, and a digital grant of rights to distribute the replacement part with the digital media product; and replacing the modifiable part with the replacement part in accordance with:
the information describing the user community preference;
the digital grant of rights to modify and distribute the digital media product;
the digital grant of rights to use the replacement part to modify the digital media product; and
the digital grant of rights to distribute the replacement part with the digital media product.

10. The apparatus of claim 9 wherein the digital grant of rights to modify and distribute the digital media product further comprises:
identification of one or more modifiable parts of the digital content;
identification of one or more specific entities authorized to modify modifiable parts of the digital content;
specification of a scope of authorized modifications for modifiable parts of the digital content;
specification of license fees for modification of modifiable parts of the digital content to be distributed in the digital media product; and
specification of requirements for review and approval of modifications.

11. The apparatus of claim 9 further comprising computer program instructions disposed within the computer memory that when executed cause the computer processor to carry out the steps of:
accepting a request from a consumer for an alternative version of the digital media product in which the modifiable part is replaced with a specifically requested replacement part;
replacing the modifiable part with the specifically requested replacement part; and
delivering the alternative version of the digital media product to the consumer.

12. The apparatus of claim 9 further comprising computer program instructions disposed within the computer memory that when executed cause the computer processor to carry out the steps of:
delivering, by streaming to a consumer, the digital media product in which the modifiable part is replaced with the replacement part;
accepting, during the streaming delivery, a request from the consumer for a modification of the digital media product in which the modifiable part is replaced with a specifically requested replacement part;
replacing, during the streaming delivery, the replacement part with the specifically requested replacement part.

13. The apparatus of claim 9 further comprising:
computer program instructions disposed within the computer memory that when executed cause the computer processor to carry out the step of accepting from an advertiser a bid representing an amount of money the advertiser is willing to pay for production of a version of the digital media product in which the modifiable part is replaced with the replacement part;
wherein replacing the modifiable part with the replacement part further comprises replacing the modifiable part with the replacement part only when the amount of the bid exceeds a predetermined threshold value.

14. The apparatus of claim 9 wherein:
the users' digital expressions of preferences include bids representing amounts of money one or more users are willing to pay for a version of the digital media product in which the modifiable part is replaced with the replacement part; and
replacing the modifiable part with the replacement part further comprises replacing the modifiable part with the replacement part only when the total amount of money represented by all such bids exceeds a predetermined threshold value.

15. The apparatus of claim 9 wherein:
the apparatus further comprises computer program instructions disposed within the computer memory that when executed cause the computer processor to carry out the step of quantifying with a numeric value the information describing a user community preference; and
replacing the modifiable part with the replacement part further comprises replacing the modifiable part with the replacement part only when the numeric value exceeds a predetermined threshold value.

16. The apparatus of claim 9, further comprising
computer program instructions disposed within the computer memory that when executed cause the computer processor to carry out the step of storing, by the media product owner the digital media product in a distributed media library, the distributed media library operatively coupled to the digital media production hub, the distributed media library comprising information describing the modifiable part of the digital media product and the digital grant of rights to modify and distribute the digital media product;
computer program instructions disposed within the computer memory that when executed cause the computer processor to carry out the step of storing by the media parts provider the replacement part in the distributed media library, the distributed media library further comprising the digital grant of rights to use the replacement part to modify the digital media product and the digital grant of rights to distribute the replacement part with the digital media product;
wherein receiving the digital media product further comprises retrieving, by the digital media production hub from the distributed media library, the digital media product and the digital grant of rights to modify and distribute the digital media product; and
wherein receiving the at least one replacement part further comprises retrieving, by the digital media production hub from the distributed media library, the at least one replacement part, the digital grant of rights to use the replacement part to modify the digital media product, and the digital grant of rights to distribute the replacement part with the digital media product.

17. A computer program product for modifying a digital media product, the digital media product comprising digital media content, the digital media content comprising digital video content including a modifiable part, the modifiable part comprising an object within a frame of the digital video content specified by a set of pixels outlining the object within the frame, the computer program product disposed in a non-transitory computer readable recordable medium, the computer program product comprising computer program instructions that when executed cause a computer processor to carry out the steps of:

producing, by a digital media production hub from users' digital expressions of preferences, information describing a user community's preference for replacing the modifiable part of the digital media product with a replacement part;

receiving, by the digital media production hub from a media product owner, the digital media product and a digital grant of rights to modify and distribute the digital media product;

receiving, by the digital media production hub from a media parts provider, at least one replacement part, a digital grant of rights to use the replacement part to modify the digital media product, and a digital grant of rights to distribute the replacement part with the digital media product; and replacing, by the digital media production hub, the modifiable part with the replacement part in accordance with:
the information describing the user community preference:
the digital grant of rights to modify and distribute the digital media product:
the digital grant of rights to use the replacement part to modify the digital media product; and
the digital grant of rights to distribute the replacement part with the digital media product.

18. The computer program product of claim 17 further comprising:

computer program instructions disposed within the non-transitory computer readable recordable medium that when executed cause the computer processor to carry out the step of storing, by the media product owner the digital media product in a distributed media library, the distributed media library operatively coupled to the digital media production hub, the distributed media library comprising information describing the modifiable part of the digital media product and the digital grant of rights to modify and distribute the digital media product;

computer program instructions disposed within the non-transitory computer readable recordable medium that when executed cause the computer processor to carry out the step of storing by the media parts provider the replacement part in the distributed media library, the distributed media library further comprising the digital grant of rights to use the replacement part to modify the digital media product and the digital grant of rights to distribute the replacement part with the digital media product;

wherein receiving the digital media product further comprises retrieving, by the digital media production hub from the distributed media library, the digital media product and the digital grant of rights to modify and distribute the digital media product; and wherein receiving the at least one replacement part further comprises retrieving, by the digital media production hub from the distributed media library, the at least one replacement part, the digital grant of rights to use the replacement part to modify the digital media product, and the digital grant of rights to distribute the replacement part with the digital media product.

* * * * *